(12) United States Patent
Majima

(10) Patent No.: US 7,459,218 B2
(45) Date of Patent: Dec. 2, 2008

(54) REWRITABLE THIN IMAGE DISPLAY SHEET, IMAGE DISPLAY, AND IMAGE DISPLAY SYSTEM

(75) Inventor: Osamu Majima, Tokyo (JP)

(73) Assignee: Majima Laboratory Inc., Tokyo (JP)

( * ) Notice: Subject to any disclaimer, the term of this patent is extended or adjusted under 35 U.S.C. 154(b) by 305 days.

(21) Appl. No.: 10/502,942

(22) PCT Filed: Jan. 31, 2003

(86) PCT No.: PCT/JP03/01026

§ 371 (c)(1),
(2), (4) Date: Jul. 29, 2004

(87) PCT Pub. No.: WO03/065116

PCT Pub. Date: Aug. 7, 2003

(65) Prior Publication Data

US 2005/0079300 A1   Apr. 14, 2005

(30) Foreign Application Priority Data

Jan. 31, 2002 (JP) ............................. 2002-061170
Jan. 31, 2003 (JP) ............................. 2003-060635

(51) Int. Cl.
*G02F 1/167* (2006.01)
*G02F 1/17* (2006.01)
*G02F 1/137* (2006.01)

(52) U.S. Cl. .................... 428/484.1; 428/203; 428/204; 428/205; 428/206; 428/207; 428/212; 428/323; 428/332; 428/693.1; 106/31.29; 106/31.64; 106/31.65; 106/31.92; 349/89; 349/90; 349/91

(58) Field of Classification Search .................. None
See application file for complete search history.

(56) References Cited

U.S. PATENT DOCUMENTS 4,124,735 A * 11/1978 O'Horo ................. 430/111.2

(Continued)

FOREIGN PATENT DOCUMENTS

EP   1107043   6/2001

(Continued)

OTHER PUBLICATIONS

Machine Translation of JP 09-281907 A (JP pub date 1997).*

(Continued)

*Primary Examiner*—Kevin M Bernatz
(74) *Attorney, Agent, or Firm*—Westerman, Hattori, Daniels & Adrian, LLP.

(57) ABSTRACT

Discloses is a rewritable thin image display sheet, an image display apparatus and an image display system. In the image display system, a low-melting-point wax 18 with a magnetic powder 16 dispersed therein is held between a heat-generation layer 12 and a transparent layer 14 which are disposed spaced apart from one another, and a zone of the low-melting-point wax 18 corresponding to a pixel for image display is selectively heated and molted by the heat-generation layer 12. Then, the magnetic powder 16 in the molten zone is displaced toward the transparent layer 14 so as to display a given image on the transparent layer. The rewritable thin image display sheet, the image display apparatus and the image display system can reliably display an image in a rewritable state while achieving a significantly simplified structure.

40 Claims, 12 Drawing Sheets

U.S. PATENT DOCUMENTS

| | | |
|---|---|---|
| 4,549,824 A | 10/1985 | Sachdev et al. |
| 4,603,073 A * | 7/1986 | Renalls et al. ............... 428/147 |
| 6,099,630 A * | 8/2000 | Kobayashi et al. ....... 106/31.64 |
| 6,556,262 B1 * | 4/2003 | Stephenson et al. ............ 349/86 |
| 6,870,661 B2 * | 3/2005 | Pullen et al. ................. 359/296 |

FOREIGN PATENT DOCUMENTS

| | | |
|---|---|---|
| EP | 1162496 A1 * | 12/2001 |
| JP | 47-10236 | 4/1972 |
| JP | 2-24633 | 1/1990 |
| JP | 2-193185 | 7/1990 |
| JP | 3-234751 | 10/1991 |
| JP | 7-294966 | 11/1995 |
| JP | 9-244556 | 9/1997 |
| JP | 9-281907 | 10/1997 |
| JP | 10-149117 | 6/1998 |
| JP | 10-260648 | 9/1998 |
| WO | WO 00/43835 | 7/2000 |

OTHER PUBLICATIONS

Derwent Abstract for EP 1162496 A1 (Derwent Acc No. 2001-060342) (EP pub date Dec. 12, 2001).*

* cited by examiner

REWRITABLE THIN IMAGE DISPLAY SHEET, IMAGE DISPLAY, AND IMAGE DISPLAY SYSTEM

TECHNICAL FIELD

The present invention relates to a rewritable thin display sheet for displaying an image in a rewritable state, an image display apparatus for writing an image into the rewritable thin display sheet in a rewritable state, and an image display system.

BACKGROUND ART

Heretofore, there has been known an image display apparatus utilizing the migration or displacement of magnetic powders. As one alternative to white boards, the image display apparatus has already been introduced to the market in a system designed such that a mixture of a white liquid and a black magnetic powder is encased in cells with a honeycomb structure, and an image, such as a character or graphic image, is displayed by means of the magnetic powder magnetically drawn in one direction using a magnetic pen or a magnetic head. Such an image display apparatus has also been developed as a paper-like display (also referred to as "electronic paper") which employs a structure designed such that microcapsule-shaped cells each containing a magnetic powder are applied on a PET (Polyethylene Terephthalate) film through a binder, and the magnetic powders in the microcapsules are displaced using a magnetic pen or the like to display an image, such as a character image.

These conventional apparatuses having a low-cost simple structure with excellent maintainability are also used as toys.

However, the following disadvantages are pointed out to the above conventional thin display sheet.

(1) The use of one pole in a magnetic dipole of a magnetic head or a magnetic pen causes difficulties in focusing a magnetic force in a small area to result in deteriorated resolution.

(2) It is difficult to concentrate a high magnetic field in a small area within a short period of time. This causes difficulties in bringing a magnetic powder into close contact with the wall of a honeycomb cell or a microcapsule and in obtaining a high contrast ratio.

(3) The use of a magnetic powder suspended by a while liquid causes the gradual displacement of the magnetic powder to result in deteriorated retentivity of a displayed character or graphic image.

(4) The use of a dipolar magnetic field causes increase in writing stroke to result in extremely deteriorated expression at edges of a character or the like.

(5) The inevitable existence of the connection areas between honeycomb cells or microcapsules causes difficulties in assuring density in a shadow region and precludes a possibility of increasing the density.

(6) The restriction in size of a honeycomb cell or a microcapsule imposes limitations on increasing resolution.

(7) The restriction in size of a honeycomb cell or a microcapsule imposes limitations on reducing the thickness of the sheet.

(8) As compared to a simple coating operation, the production process of honeycomb cells or microcapsules is liable to be complicated and increased in cost.

In view of the above circumstances, it is therefore a primary object of the present invention to provide a rewritable thin image display sheet, an image display apparatus and an image display system, capable of reliably displaying an image in a rewritable state while achieving a significantly simplified structure.

It is another object of the present invention to provide a rewritable thin image display sheet, an image display apparatus and an image display system, capable of reliably displaying an image with an enhanced resolution while achieving a significantly simplified structure.

It is still another object of the present invention to provide a rewritable thin image display sheet, an image display apparatus and an image display system, capable of reliably displaying an image while achieving a significantly simplified structure having a significantly reduced thickness.

It is yet another object of the present invention to provide a rewritable thin image display sheet, an image display apparatus and an image display system, capable of reliably displaying an image with an excellent gradation expression while achieving a significantly simplified structure.

DISCLOSURE OF INVENTION

In order to solve the aforementioned problems and achieve the above objects, according to a first aspect of the present invention, there is provided a rewritable thin image display sheet comprising a base layer, a transparent layer disposed apart from the base layer by a given distance, and a medium which is filled in the space between the base layer and the transparent layer while containing a magnetic powder dispersed therein and adapted to be changeable between a first phase where the magnetic powder is allowed to be displaced and a second phase where the magnetic powder is prohibited from being displaced.

In the rewritable thin image display sheet set forth in the first aspect of the present invention, the medium may be made of a low-temperature-melting material which exhibits the first phase at a high temperature and the second phase at a low temperature.

Further, the base layer may include a resistive layer having a given electrical resistance, and an electrode layer disposed to cover a surface of the resistive layer on the side of the transparent layer. The electrode layer may be an overall electrode covering over the entire surface of the resistive layer on the side of the transparent layer.

The base layer may include a resistive layer having a given electrical resistance, and a pair of electrode layers each disposed to cover a corresponding one of the opposite surfaces of the resistive layer and formed with a matrix-shaped conductive pattern. The respective conductive patterns of the electrode layers may have plural pairs of opposed intersection points to be selectively supplied with a current therebetween, whereby a current is passed through a region of the resistive layer located between the selected intersection points of the respective conductive patterns to selectively generate heat in the current-passing region of the resistive layer.

The resistive layer may include a synthetic resin sheet containing carbon dispersed therein to have the given electrical resistance so as to generate heat in response to a current passed therethrough. In this case, the carbon may be in the form of carbon particles. Further, the carbon particles may have a nano-particle size.

The electrode layer may include a metal electrode. In this case, the metal electrode may be made of nickel.

The rewritable thin image display sheet set forth in the first aspect of the present invention may include a spacer defining the distance between the base layer and the transparent layer.

The spacer may be formed in a bead shape. Further, the spacer may have a diameter at least 5 times greater than the particle size of the magnetic powder.

In the rewritable thin image display sheet set forth in the first aspect of the present invention, the base layer may be composed of a transparent layer.

In the rewritable thin image display sheet set forth in the first aspect of the present invention, the magnetic powder may be colored in an arbitrary color.

The aforementioned low-temperature-melting material may include a low-melting-point wax to be molted in a temperature range of 60 to 120° C.

The low-temperature-melting material may also be colored in white, and the magnetic powder may be colored in a color other than white. In this case, the magnetic powder may be colored in black.

In the rewritable thin image display sheet set forth in the first aspect of the present invention, the transparent layer may include a film made of transparent resin.

In case where the base layer is composed of a transparent layer, the transparent layer may include a film made of transparent resin. The transparent layer may be formed to have flexibility.

In the rewritable thin image display sheet set forth in the first aspect of the present invention, each of the base layer and the transparent layer may be formed to have flexibility.

In the rewritable thin image display sheet set forth in the first aspect of the present invention, each of the particles of the magnetic powder may include a magnetic core and a resin coating layer covering over the outer periphery of the magnetic core.

In this case, the magnetic core may be formed of a spherical sintered ferrite particle.

The magnetic core may be formed of a fine ferrite powder solidified with a binder.

The magnetic core may be formed of a spherical agglomerate of granular sintered ferrite.

The magnetic core may be formed of a spherical agglomerate of crystalline ferrite.

The resin coating layer may be colored in an arbitrary color.

The resin coating layer may be formed as a solid.

The resin coating layer may be formed through a foaming process.

According to a second aspect of the present invention, there is provided a rewritable thin image display sheet comprising a first transparent layer, a second transparent layer disposed apart from the first transparent layer by a given distance, an intermediate heat-generation layer disposed between the first and second transparent layers and adapted to generate heat at an arbitrary position thereof, a first low-temperature-melting material filled in the space between the intermediate heat-generation layer and the first transparent layer while containing a magnetic powder dispersed therein, and a second low-temperature-melting material filled in the space between the intermediate heat-generation layer and the second transparent layer while containing a magnetic powder dispersed therein.

The rewritable thin image display sheet set forth in the second aspect of the present invention may include a spacer defining the respective distances between the first transparent layer and the intermediate heat-generation layer and between the second transparent layer and the intermediate heat-generation layer.

The spacer may be formed in a bead shape. Further, the spacer may have a diameter at least 5 times greater than the particle size of the magnetic powder.

In the rewritable thin image display sheet set forth in the second aspect of the present invention, the magnetic powder may be colored in an arbitrary color.

In the rewritable thin image display sheet set forth in the second aspect of the present invention, the low-temperature-melting material may include a low-melting-point wax to be molted in a temperature range of 60 to 120° C.

In the rewritable thin image display sheet set forth in the second aspect of the present invention, the low-temperature-melting material may be colored in white, and the magnetic powder may be colored in a color other than white. In this case, the magnetic powder may be colored in black.

In the rewritable thin image display sheet set forth in the second aspect of the present invention, each of the first and second transparent layers may include a film made of transparent resin.

In the rewritable thin image display sheet set forth in the second aspect of the present invention, each of the first and second transparent layers may be formed to have flexibility.

In the rewritable thin image display sheet set forth in the second aspect of the present invention, each of the particles of the magnetic powder may include a magnetic core and a resin coating layer covering over the outer periphery of the magnetic core.

In this case, the magnetic core may be formed of a spherical sintered ferrite particle.

The magnetic core may be formed of a fine ferrite powder solidified with a binder.

The magnetic core may be formed of a spherical agglomerate of granular sintered ferrite.

The magnetic core may be formed of a spherical agglomerate of crystalline ferrite.

The resin coating layer may be colored in an arbitrary color.

The resin coating layer may be formed as a solid.

The resin coating layer may be formed through a foaming process.

According to a third aspect of the present invention, there is provided an image display apparatus for displaying an image in a rewritable state on an image display sheet including a base layer, a transparent layer disposed apart from the base layer by a given distance, and a medium which is filled in the space between the base layer and the transparent layer while containing a magnetic powder dispersed therein, and adapted to be changeable between a first phase where the magnetic powder is allowed to be displaced and a second phase where the magnetic powder is prohibited from being displaced. The image display apparatus comprises phase change means for allowing a zone of the medium corresponding to a pixel to be selectively changed from the second phase into the first phase, and displacement means for allowing the magnetic powder dispersed in the medium zone changed into the first phase to be displaced toward the transparent layer, whereby a given image is displayed on the image display sheet in accordance with the displaced magnetic powder on the transparent layer.

In the image display apparatus set forth in the third aspect of the present invention, the medium may be made of a low-temperature-melting material which exhibits a liquid phase as the first phase at a high temperature and a solid phase as the second phase at a low temperature, and the phase change means may be heating/melting means for heating the medium up to the high temperature.

In this case, the base layer may include a resistive layer having a given electrical resistance, and an electrode layer disposed to cover a surface of the resistive layer on the side of the transparent layer. The electrode layer may be an overall electrode covering over the entire surface of the resistive layer on the side of the transparent layer.

The heating/melting means may include current supply means for passing a current through an arbitrarily selected region of the resistive layer to selectively generate heat in the current-passing region of the resistive layer. Further, the current supply means may include a current supply head. In this case, the current supply means may be adapted to pass a current between a region of the resistive layer in contact with the current supply head and the electrode layer so as to selectively generate heat in the current-passing region of the resistive layer.

The base layer may include a resistive layer having a given electrical resistance, and a pair of electrode layers each disposed to cover a corresponding one of the opposite surfaces of the resistive layer and formed with a matrix-shaped conductive pattern. The respective conductive patterns of the electrode layers may have plural pairs of opposed intersection points to be selectively supplied with a current therebetween, whereby a current is passed through a region of the resistive layer located between the selected intersection points of the respective conductive patterns to selectively generate heat in the current-passing region of the resistive layer.

The displacement means may be adapted to displace the magnetic powder in accordance with a magnetic force. In this case, the displacement means may include a permanent magnet disposed on the side of the transparent layer. Alternatively, the displacement means may include a magnetic head having an electromagnet disposed on the side of the transparent layer. The electromagnet may be adapted to vary the magnetic force depending on the value of current to be supplied thereto.

The heating/melting means may be disposed on the side of the base layer, and the displacement means may be disposed on the side of the transparent layer in opposed relation to the heating/melting means while interposing the low-temperature-melting material between the heating/melting means and the displacement means. In this case, the displacement means may be disposed spaced apart from the transparent layer.

The base layer may be composed of a transparent layer.

In case where the medium is made of the low-temperature-melting material, and the phase change means is the heating/melting means, the image display apparatus set forth in the third aspect of the present invention may further include cooling means for cooling and solidifying the low-temperature-melting material in a liquid phase.

The cooling means may be disposed adjacent to the displacement means.

The cooling means may be disposed in contactable relation to the transparent layer.

In case where the medium is made of the low-temperature-melting material, and the phase change means is the heating/melting means, the image display apparatus set forth in the third aspect of the present invention may further include image erasing means for erasing an image displayed on the image display sheet.

The image erasing means may include a magnetic erasing head disposed on the side of the base layer, and a selective erasing head disposed on the side of the transparent layer.

The selective erasing head may be adapted to be moved in synchronous with the magnetic erasing head.

The selective erasing head may include an infrared lamp, and a reflecting mirror for reflecting light and heat emitted from the infrared lamp toward the image display sheet. In this case, the reflecting mirror may be a parabolic mirror. Alternatively, the reflecting mirror may be an elliptic mirror.

The selective erasing mirror may be adapted to be movable along a direction orthogonal to the image display sheet.

The heating/melting means may include a laser system.

According to a fourth aspect of the present invention, there is provided an image display apparatus for displaying an image in a rewritable state on at least either one of the opposite surfaces of an image display sheet including a first transparent layer, a second transparent layer disposed apart from the first transparent layer by a given distance, an intermediate heat-generation layer disposed between the first and second transparent layers and adapted to generate heat at an arbitrary position thereof, a first low-temperature-melting material filled in the space between the intermediate heat-generation layer and the first transparent layer while containing a magnetic powder dispersed therein, and a second low-temperature-melting material filled in the space between the intermediate heat-generation layer and the second transparent layer while containing a magnetic powder dispersed therein. The image display apparatus comprises heating/melting means for heating a region of the intermediate heat-generation layer corresponding to a pixel to melt the first low-temperature-melting material, and displacement means for displacing the magnetic powder dispersed in the molten zone of the first low-temperature-melting material, toward the first transparent layer, whereby a given image is displayed on the first transparent layer of the image display sheet in accordance with the displaced magnetic powder on the first transparent layer.

In the image display apparatus set forth in the fourth aspect of the present invention, the displacement means may be adapted to displace the magnetic powder in accordance with a magnetic force. In this case, the displacement means may include a permanent magnet disposed on the side of the second transparent layer. Alternatively, the displacement means may include a magnetic head having an electromagnet disposed on the side of the second transparent layer. The electromagnet may be adapted to vary the magnetic force depending on the value of current to be supplied thereto.

The displacement means may be disposed spaced apart from the second transparent layer.

The image display apparatus set forth in the fourth aspect of the present invention may further include cooling means for cooling and solidifying the molten first low-temperature-melting material.

The cooling means may be disposed in opposed relation to the displacement means while interposing the image display sheet therebetween.

The cooling means may be disposed in contactable relation to the first transparent layer.

According to a fifth aspect of the present invention, there is provided an image display system comprising holding a low-temperature-melting material with a magnetic powder dispersed therein, between a heat-generation layer and a transparent layer which are disposed spaced apart from one another, allowing a zone of the low-temperature-melting material corresponding to an image display to be selectively heated and molted by the heat-generation layer, and displacing the magnetic powder in the molten zone toward the transparent layer so as to display a given image on the transparent layer.

In the image display system set forth in the fifth aspect of the present invention, the magnetic powder in the molten zone may be displaced toward the transparent layer by means of a magnetic force.

In the image display system set forth in the fifth aspect of the present invention, the heat-generation layer may include a resistive layer capable of generating heat in response to a current passed therethrough. In this case, the zone of the low-temperature-melting material corresponding to a pixel in the image display may be heated and molten by the resistive layer.

The image display system set forth in the fifth aspect of the present invention may include, after the image is displayed in accordance with the displaced magnetic powder, cooling and solidifying the molten zone to fix the image.

Further, the image display system may include heating and melting a part of the solidified low-temperature-melting material, and then displacing the magnetic powder on the transparent layer toward the base layer to erase a part of the image. Alternatively, the image display system may include heating and melting the solidified low-temperature-melting material in its entirety, and then displacing the magnetic powder on the transparent layer toward the base layer to erase the image in its entirety.

BEST MODE FOR CARRYING OUT THE INVENTION

Figure 1:
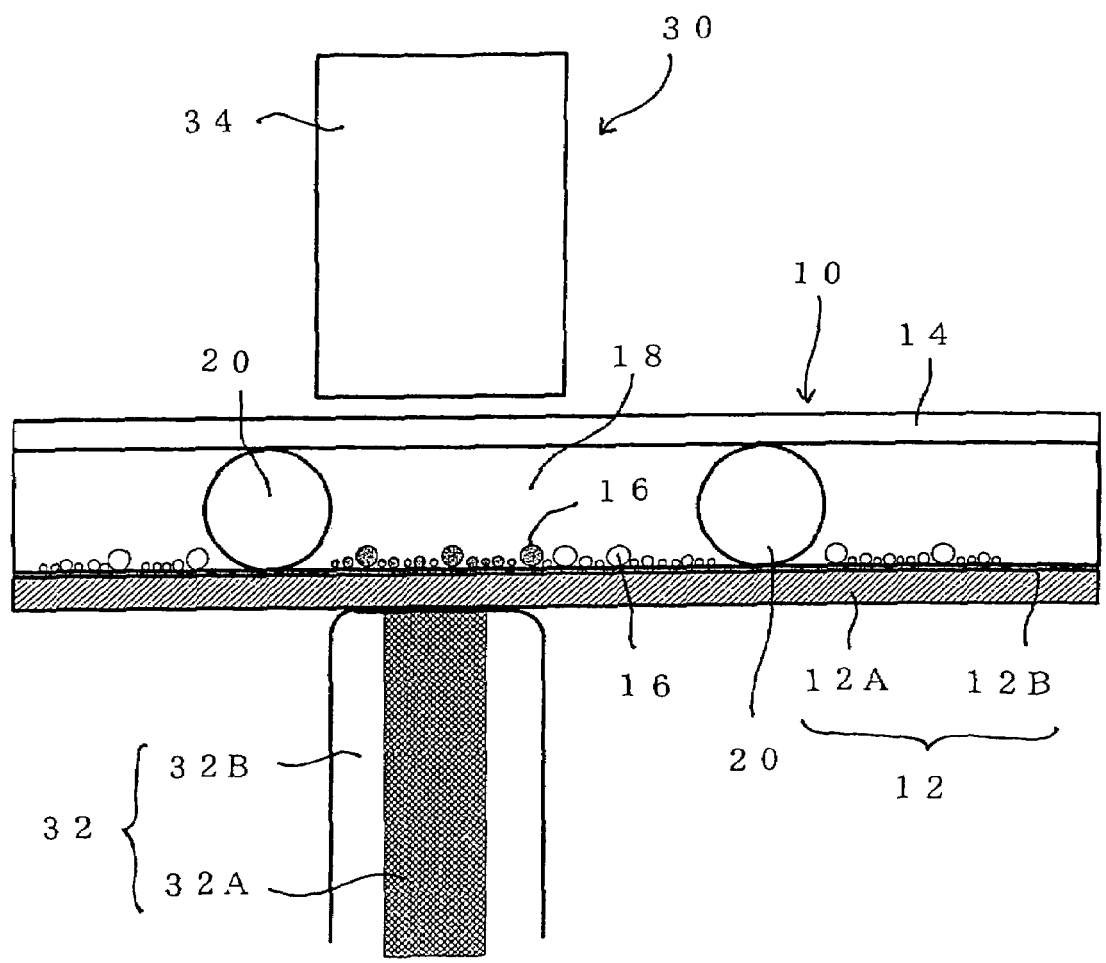
FIG. 1 is a sectional view showing a rewritable thin image display sheet and an image display apparatus according to one embodiment of the present invention.

With referent to the accompanying drawings, a rewritable thin image display sheet, an image display apparatus and an image display system according to one embodiment of the present invention will now be described in detail.

The rewritable thin image display sheet according to the embodiment will be first described.

This rewritable thin image display sheet (hereinafter referred to as "display sheet" for brevity) 10 fundamentally comprises a base layer 12, a transparent layer 14 disposed apart from the base layer 12 by a given distance for achieving a desirably reduced thickness, and a medium made of a low-temperature-melting material, specifically a low-melting-point wax 18, and filled in the space between the base layer 12 and the transparent layer 14. The low-melting-point wax 18 contains a magnetic powder 16 formed through an emulsion polymerization process and homogeneously dispersed therein. Further, the low-melting-point wax 18 is changeable between a first phase where the magnetic powder 16 is allowed to be displaced and a second phase where the magnetic powder is prohibited from being displaced.

In this embodiment, the base layer 12 is composed of a resistive layer 12A having a given electrical resistance, and an electrode layer 12B disposed to cover a surface of the resistive layer 12A. The resistive layer 12A is formed of a polyimide resin sheet containing carbon dispersed therein to have the given electrical resistance so as to generate heat in response to a current passed therethrough. The electrode layer 12B is composed of a nickel electrode coated on the entire inner surface of the resistive layer 12A.

Specifically, the resistive layer 12A is formed of a carbon-loaded polyimide cast film containing about 20 to 30% of carbon to adjust its electrical resistivity in the range of 10 to 300 O·cm. Further, instead of the polyimide film, the resistive layer 12A may be formed of an accetylcellulose or polycarbonate film. As described above, the resistive layer contains carbon to secure conductivity. Preferably, the carbon is contained in the form of nano-particles. It is also understood that the resistive layer may contain a carbon nano-tube or carbon fullerene. In case of using a carbon nano-tube, it can be contained in the resistive layer only at about 2 to 5% to achieve the above electrical resistivity.

The nickel electrode serving as the above electrode layer 12B may be deposited on the inner surface of the resistive layer 12A through an electroless plating process, a vacuum deposition process or a sputtering process.

An appropriate number of spacers 20 are provided between the base layer 12 and the transparent layer 14 to define or assure the distance therebetween and allow them to be disposed in parallel relation to one another. In this embodiment, each of the spacers 20 is formed in a spherical bead shape. More specifically, the spacers 20 are formed of glass beads having a diameter of about 10 μm as a central value (a size distribution ranging from 5 to 15 μm). The diameter of the bead spacer 20 is set at a value at least 5 times greater than the particle size of the magnetic powder 16. In addition to glass, the spacer is preferably made of a material having a specific gravity less different from that of the low-melting-point wax 19, such as synthetic resin or divinyl benzene with a specific gravity of 1.19. The spacers 20 may be provided at a mixing ratio of about 5 to 10%.

In this embodiment, the low-melting-point wax 18 is made of petroleum-based paraffin having a melting point ranging from 60 to 120° C., and colored in white using a white pigment. Preferably, this white pigment has a high degree of whiteness and a high refractive index. Specifically, the white pigment may be formed of $TiO$, $SiO_2$, $Al_2O_3$, $ArO_2$ or $CaCO_3$ while powder having a particle size of about 0.3 μm, and mixed with the paraffin in the range of about 30 to 50 wt %.

The magnetic powder 16 is formed to have a different color from that of the low-melting-point wax 18. In this embodiment, the magnetic powder 16 is formed of ferrite powder colored in black. The magnetic powder 16 made of iron oxide has a particle size of about 5 to 10 μm. The structure of the magnetic powder 16 will be described in detail later.

In this embodiment, the transparent layer 14 is composed of a panel made of heat-resistant transparent synthetic resin, such as vinylidene chloride. More specifically, the transparent layer 14 is formed of a transparent film having a heat resistance against about 130° C. Preferably, the transparent layer 14 has a refractive index less different from that of the low-melting-point wax 18. In addition to the above vinylidene chloride, the transparent layer 14 is preferably made of synthetic resin, such as meta-acrylic resin, polychlorotrifluoroethylene, vinylidene polyfluoride, acetylcellulose or polyester. The outer surface of the transparent layer 14 is coated with an anti-reflection film (not shown).

Each of the base layer 12 and the transparent layer 14 is formed to have flexibility. Thus, the display sheet 10 can have a thin shape and flexibility in its entirety to satisfy the requirement as a paper-like structure so as to provide an image display sheet structure in place of conventional sheets (papers).

An image display apparatus 30 (hereinafter referred to as "display apparatus" for brevity) incorporating the aforementioned display sheet 10 so as to display an arbitrary image in a rewritable state on the display sheet 10 will be described in detail below.

This display apparatus 30 is designed such that the display sheet is detachably attached thereto, and an arbitrary image can be written in a rewritable state on the attached display sheet 10. Further, the display sheet 10 is designed such that it can be detached from the display apparatus 30 after the written image is fixed (stabilized), and freely carried while maintain the image in the fixed state.

Specifically, the display apparatus comprises a current supply head 32 serving as heating/melting means for heating a zone of the low-melting-point wax 18 of the display sheet 10 corresponding to an image display to melt the zone of the low-melting-point wax 18, a magnetic head 34 serving as displacement means which is disposed on the side of the transparent layer 14 of the display sheet 10 to be located adjacent to the outer surface of the transparent 14 in a non-contact manner and in opposed relation to the current supply head 32 while interposing the display sheet 10 therebetween, and adapted to displace the black magnetic powder 16 in the molten zone of the low-melting-point wax 18, toward the transparent layer 14, and a scan mechanism for moving the current supply head 32 and the magnetic head 34 integrally along the surface of the display sheet 20.

The display apparatus 30 includes a ground terminal to be electrically connected to the electrode layer 12B constituting the base layer 12 when the display sheet 10 is attached to the display apparatus 30.

The scan mechanism is operable, but not shown in detail, to move the current supply head 32 and the magnetic head 34 along an auxiliary scan direction corresponding to the rightward/leftward direction in FIG. 1 and along a primary scan direction corresponding to a direction orthogonal to the surface of the drawing sheet. Thus, the current supply head 32 and the magnetic head 34 can be scanningly moved along the entire surface of the display sheet 10. That is, in the zone of the low-melting-point wax 18 which has been molten by the current supply head 32, a given image can be displayed on the display sheet 10 in accordance with the black magnetic powder 16 which has been displaced onto the transparent layer 14 by the magnetic head 34.

The current supply head 32 includes a current supply electrode 32A disposed in contactable relation to the resistive layer 12A of the base layer 12, and a ceramic electrode guard 32B surrounding the outer periphery of the current supply electrode 32A. As shown in FIG. 1, the current supply electrode 32A is formed in a needle shape. The area of a portion of the current supply electrode 32A to be in contact with the resistive layer 12A is determined in connection with an intended resolution of an image to be displayed. In this embodiment, the contact area is set at 60×60 μm for a resolution of 400 dpi, and at 20×20 μm for a resolution of 1200 dpi.

Figure 2:
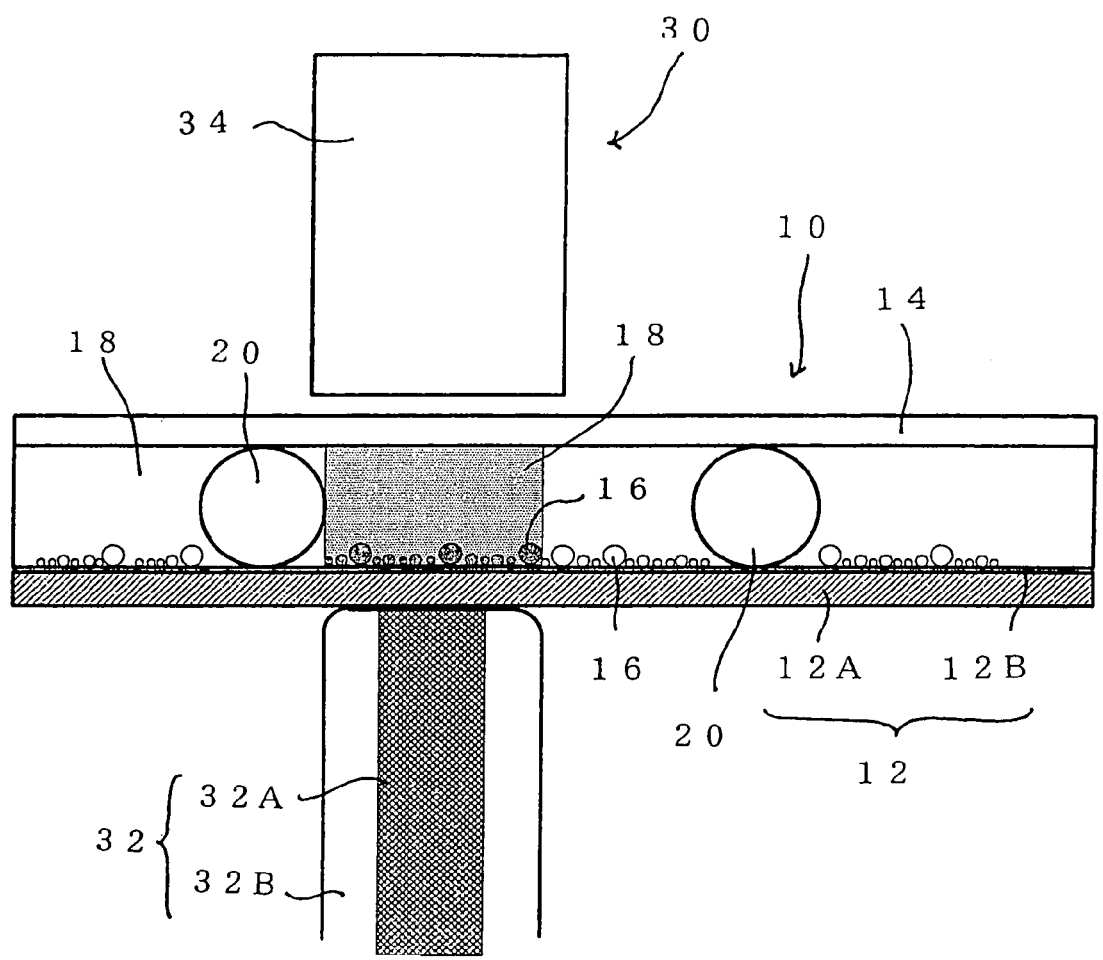
FIG. 2 is a sectional view showing the state after a zone of a low-melting-point wax corresponding to a pixel is selectively molten in the image display sheet illustrated in FIG. 1.

Thus, the current supply electrode 32A having an extremely small contact portion with the resistive layer 12A can concentratedly or locally pass a current between the contact portion and the electrode layer 12B, so that the current is passed through only the region of the resistive layer 12A corresponding to the position in contact with the current supply electrode 32A. Therefore, as shown in FIG. 2, the current-passing region of the resistive layer 12A determined by the position in contact with the current supply electrode 32A will generate heat so as to selectively heat and melt a zone of the low-melting-point wax 18 adjacent to the heat-generation region.

In this embodiment, the display apparatus is designed such that the resistive layer 12A heated in conjunction with the above current supply operation in the current supply head 32 has a temperature of 150 to 200° C. By contrast, the low-melting-point wax 18 has a melting point of 60 to 110° C. Thus, according to the current supply operation in the current supply head 32, a zone of low-melting-point wax 18 corresponding to the position in contact with the current supply head 32 is reliably molted.

In this embodiment, the magnetic head 34 is composed of a permanent magnet. Thus, the black magnetic powder 16 contained in the zone of the low-melting-point wax 18 heated and molted by the current from the current supply head 32 is drawn by a magnetic force of the magnetic head 34 composed of the permanent magnet, and displaced toward the transparent layer 14. The black magnetic powder 16 displaced onto the inner surface of the transparent layer 14 can be visually seen through the transparent layer 14 to serve as 1 (one) dot of an image to be displayed.

An image display system in the above image display apparatus 30 will be described below.

The display sheet 10 is attached to the image display apparatus 30, and the electrode layer 12B is connected to the ground terminal (not shown) to go through the preparation for an image writing operation. Then, the current supply head 32 and the magnetic head 34 are moved to a writing initial position by a control unit (not shown). A given scanning operation is initiated from the writing initial position.

When the scanning operation is initiated, the current supply head 32 and the magnetic head 34 start linear movement together, and a current is supplied through the current supply electrode 32A of the current supply head 32 only for a given time of period every time they are moved to a position corresponding to each of dots (pixels) as the basic unit of image to be displayed. According to this current supply operation, the current is passed between the current supply electrode 32A and the electrode layer 12B. In the resistive layer 12A, the current is passed through only a region of the registive layer 12A corresponding to the contact position with the current supply electrode 32A to allow only the current-passing region to generate heat.

Thus, the current-passing region of the resistive layer 12A serves as a heat-generation region to melt a zone 18' of the low-melting-point wax 18 corresponding to the heat-generation region in accordance with the generated heat, as indicated by the shaded zone in FIG. 2, and the black magnetic powder 16 contained in the molten zone 18' of the low-melting-point wax 18 is displaced toward the transparent layer 14 by a magnetic force of the magnetic head 34 moved integrally with the current supply head 32.

Figure 3:
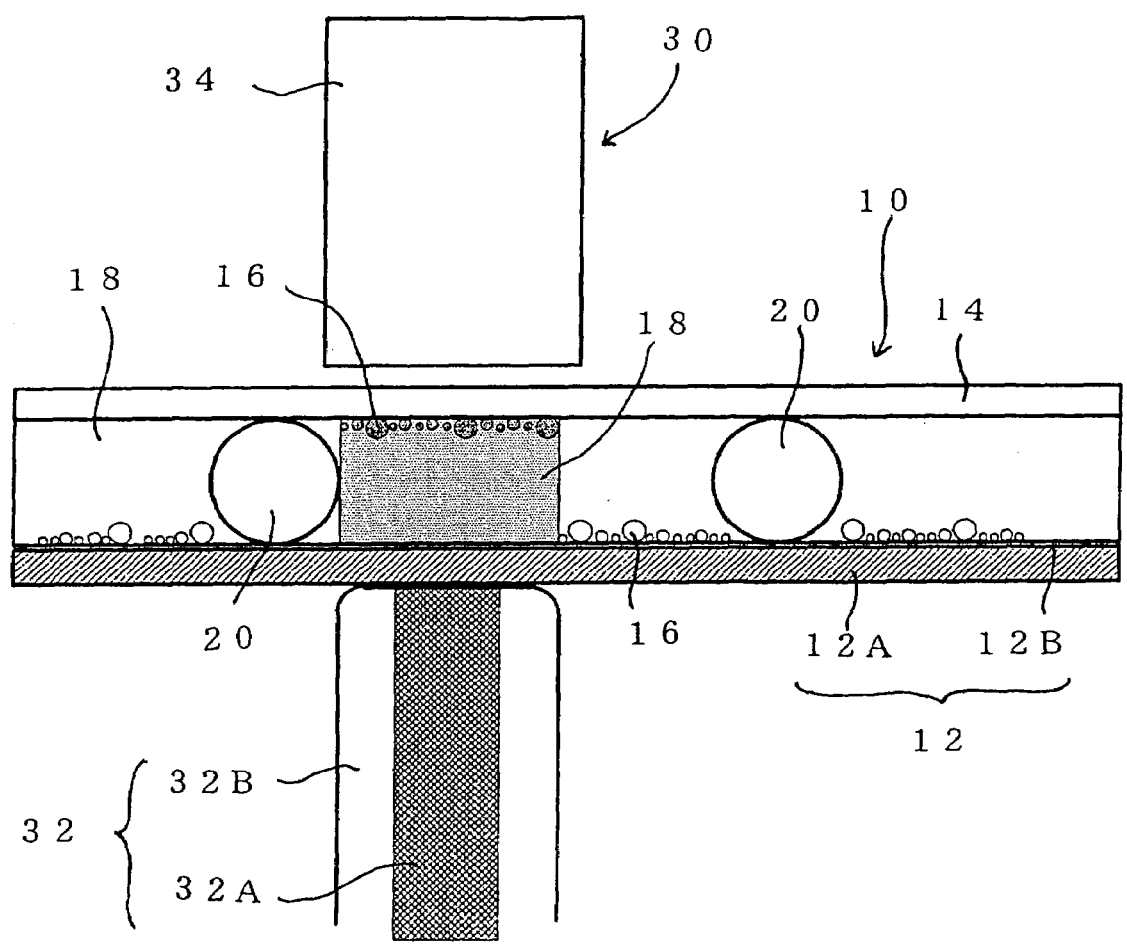
FIG. 3 is a sectional view showing the state after a black magnetic powder is displaced onto a transparent layer in the image display sheet illustrated in FIG. 1.

In this manner, the displaced black magnetic powder 16 is collected on the inner surface of the transparent layer 14 as shown in FIG. 3 to form a black dot in one pixel.

Through the above process, a black-dot-based coloring operation is completed in one zone corresponding to one given pixel. Subsequently, the current supply head 32 and the magnetic head 34 are moved to a position corresponding to an adjacent second pixel along the auxiliary scan direction. If the black-dot-based coloring operation is performed in the second pixel, the same process as described above will be repeated. Otherwise, when white color is left as ground color without performing the black-dot-based coloring operation, the entire current supply operation is omitted, and the current supply head 32 and the magnetic head 34 are moved to a position corresponding to an adjacent third pixel. When the display operation for one line is completed in this way, the current supply head 32 and the magnetic head 34 are returned to the original or initial position, and then moved along the primary scan direction by a distance corresponding to one pixel. Then, the same display operation as described above is repeatedly performed along the auxiliary scan direction.

In the display sheet 10 on which a given image has already been displayed, a current is passed through the entire surface of the resistive layer 12A to heat and melt the entire zone of the low-melting-point wax 18. Then, during melting in the entire zone of the low-melting-point wax 18, the black magnetic powder 16 is moved toward the base layer 12 using a permanent magnet disposed on the side of the base layer 12 to remove the block magnetic powder completely from the transparent layer 14 and preclude any image from being displayed on the transparent layer 14. That is, any image on the display sheet is erased.

The present invention is not limited to the above structures and processes or operations, but various modifications may be made without departing from the spirit and scope of the present invention. In the following description, the same component or element as that in the above embodiment is defined by the same reference numeral, and its description will be omitted.

For example, while various numerical values have been shown in connection with the above embodiment, it is understood that they are described simply by way of example, and the present invention is not limited by such examples.

Further, while the magnetic powder in above embodiment is formed as the black magnetic powder 16, the present invention is not limited to such a specific color, but the magnetic powder may be formed to have any other suitable color different from that of the low-melting-point wax 18 serving as a ground color.

Figure 4:
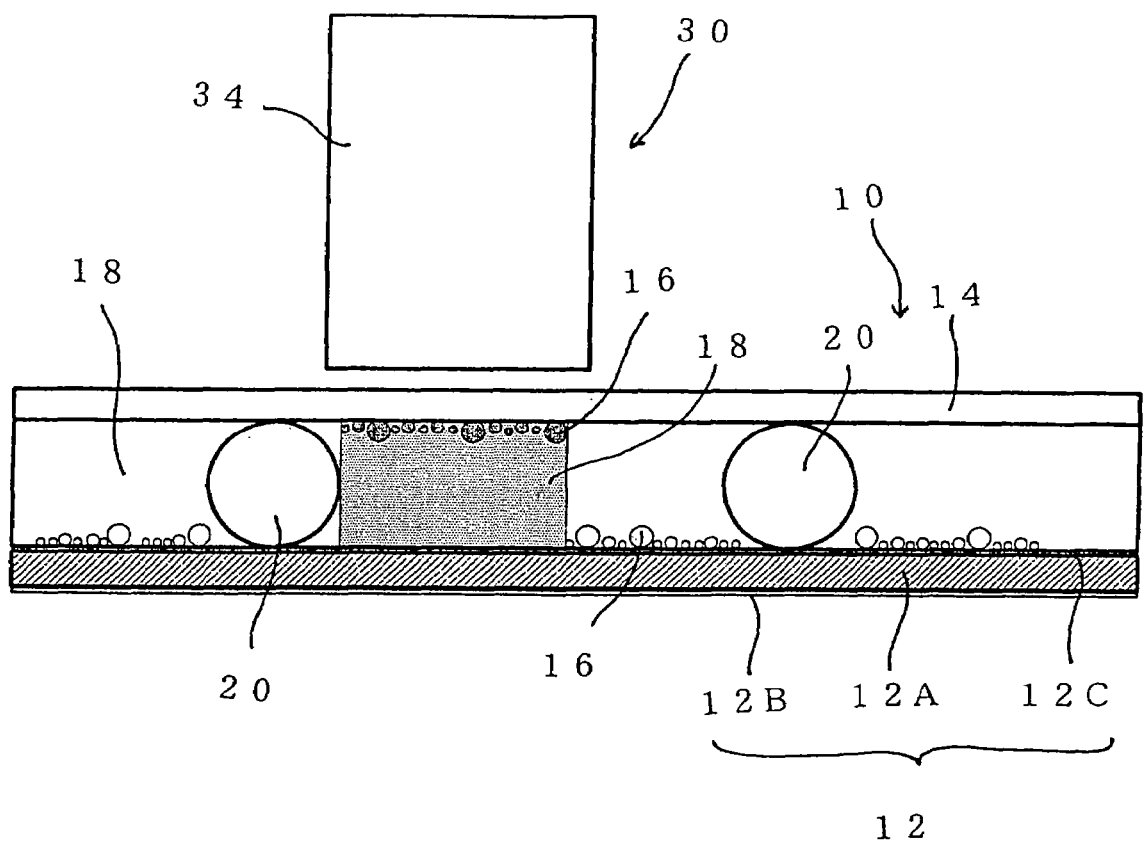
FIG. 4 is a sectional view showing a first modification of the rewritable thin image display sheet and the image display apparatus of the present invention.

While the electrode layer 12B of the base layer 12 in the above embodiment is formed as the overall electrode, the present invention is not limited to such an electrode structure. For example, as shown in FIG. 4 as a first modification, the base layer 12 may includes a resistive layer 12A having a given electrical resistance, and a pair of electrode layers 12B, 12C each disposed to cover a corresponding one of the opposite surfaces of the resistive layer 12A and formed with a matrix-shaped conductive pattern. The respective conductive patterns of the electrode layers may have plural pairs of opposed intersection points to be selectively supplied with a current therebetween, and a region corresponding to a pixel may be determined by the selected intersection points of the respective conductive patterns, according to a control signal arranged separately. In this structure, a current is passed through the region of the resistive layer 12A located between the selected intersection points to selectively generate heat in the current-passing region of the resistive layer 12A.

According to the first modification constructed as above, instead of the structure in the aforementioned embodiment where the current supply head is moved along the primary and auxiliary scan directions to scan the entire surface of the display sheet so as to display an image, the matrix-shaped electrode layers 12B, 12C can be electrically scanned according to the control signal to display an image on the entire surface of the display sheet.

Figure 5:
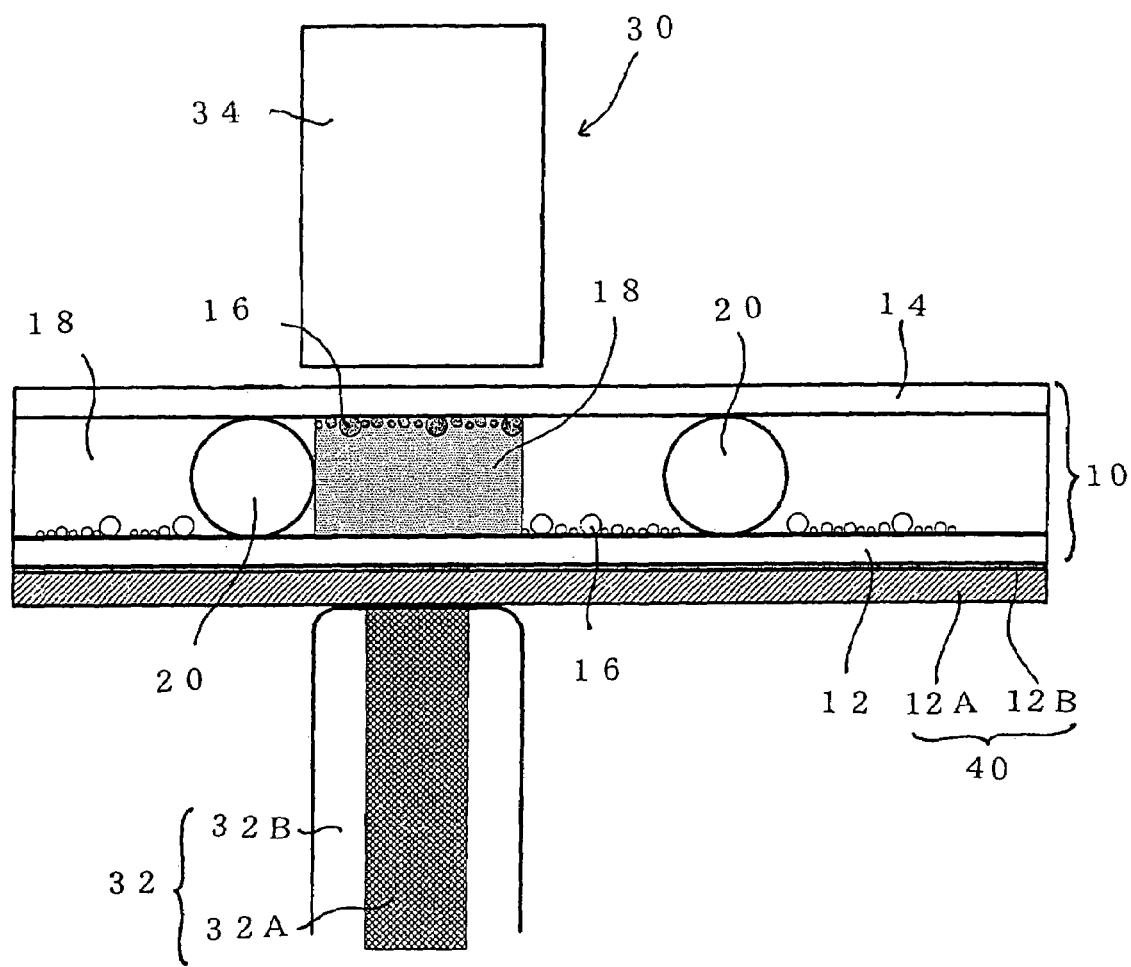
FIG. 5 is a sectional view showing a second modification of the rewritable thin image display sheet and the image display apparatus of the present invention.

Furthermore, while the base layer 12 in the aforementioned embodiment is composed of the resistive layer 12A and the electrode layer 12B, the present invention is not limited to such a structure. For example, in a display sheet 10' as shown in FIG. 5 as a second modification, a base layer 12 itself may be formed of a transparent sheet. In this case, it is necessary to prepare a heat-generation plate 40 corresponding to the base layer having the resistive layer 12A and the electrode layer 12B.

According to the second modification constructed as above, an image can be displayed on any of the front and back surfaces of the display sheet 10' to provide usability close to that of papers and enhanced effectiveness. In addition, the display sheet 10' has no structure corresponding to the base layer 12 in the aforementioned embodiment, or does not include the resistive layer 12A and the electrode layer 12B. Thus, the display sheet 10' can have a simplified structure, and enhanced ductility or flexibility as compared to the display sheet 10 in the aforementioned embodiment to provide further improved usability.

It is understood that the means for displaying a given image on the display sheet 10' in the second modification is not limited to the heat-generation plate 40, but a conventional thermal head (not shown) may be used.

Figure 6:
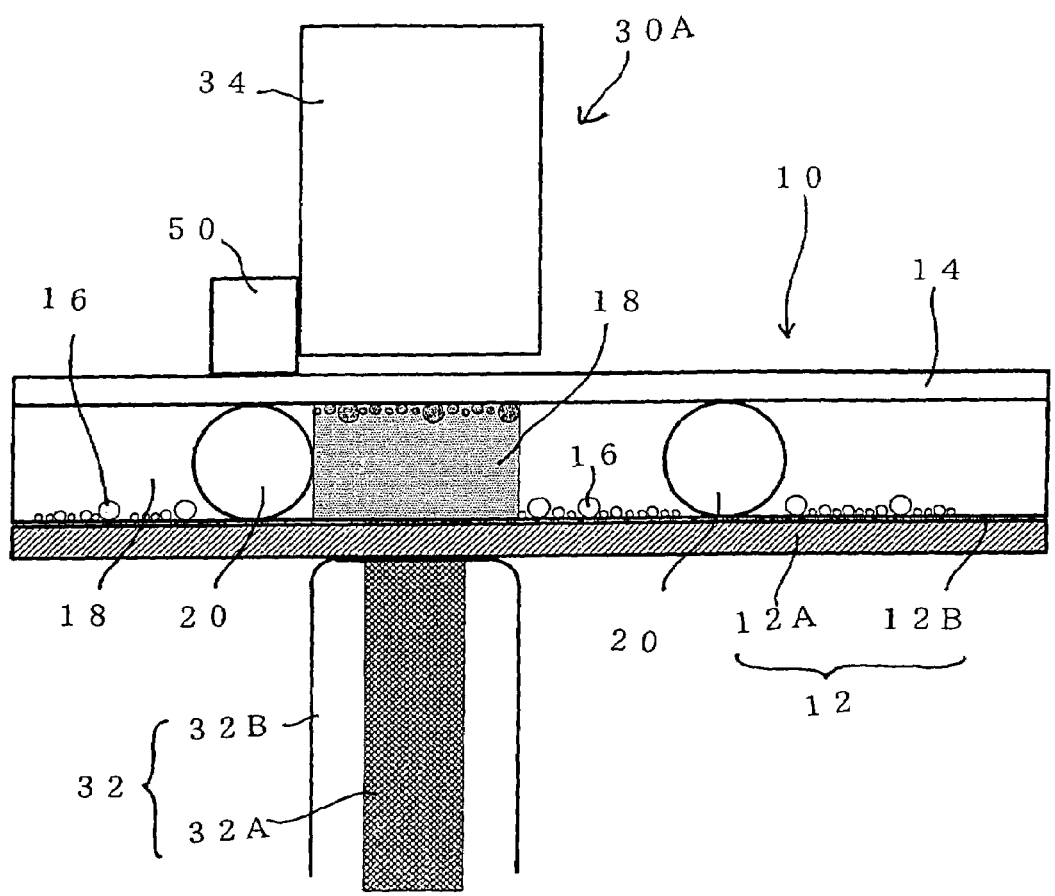
FIG. 6 is a sectional view showing a third modification of the rewritable thin image display sheet and the image display apparatus of the present invention.

While the aforementioned embodiment includes no means for cooling the low-melting-point wax 18 after an image is displayed, the present invention is not limited to such a structure. For example, as shown in FIG. 6 as a third modification, an image display apparatus 30A may includes a cooling head 50 which is attached onto the side surface of a magnetic head 34 on the upstream side relative to the auxiliary scan direction, and adapted to cool a low-melting-point wax 18 in its molten state within a short period of time so as to fix (stabilize) an displayed image.

In the third modification, the cooling head 50 is a water-cooled type designed such that the front end face of the cooling head 50 serving as a cooling surface is brought into contact with the outer surface of a transparent layer 14.

Figure 7:
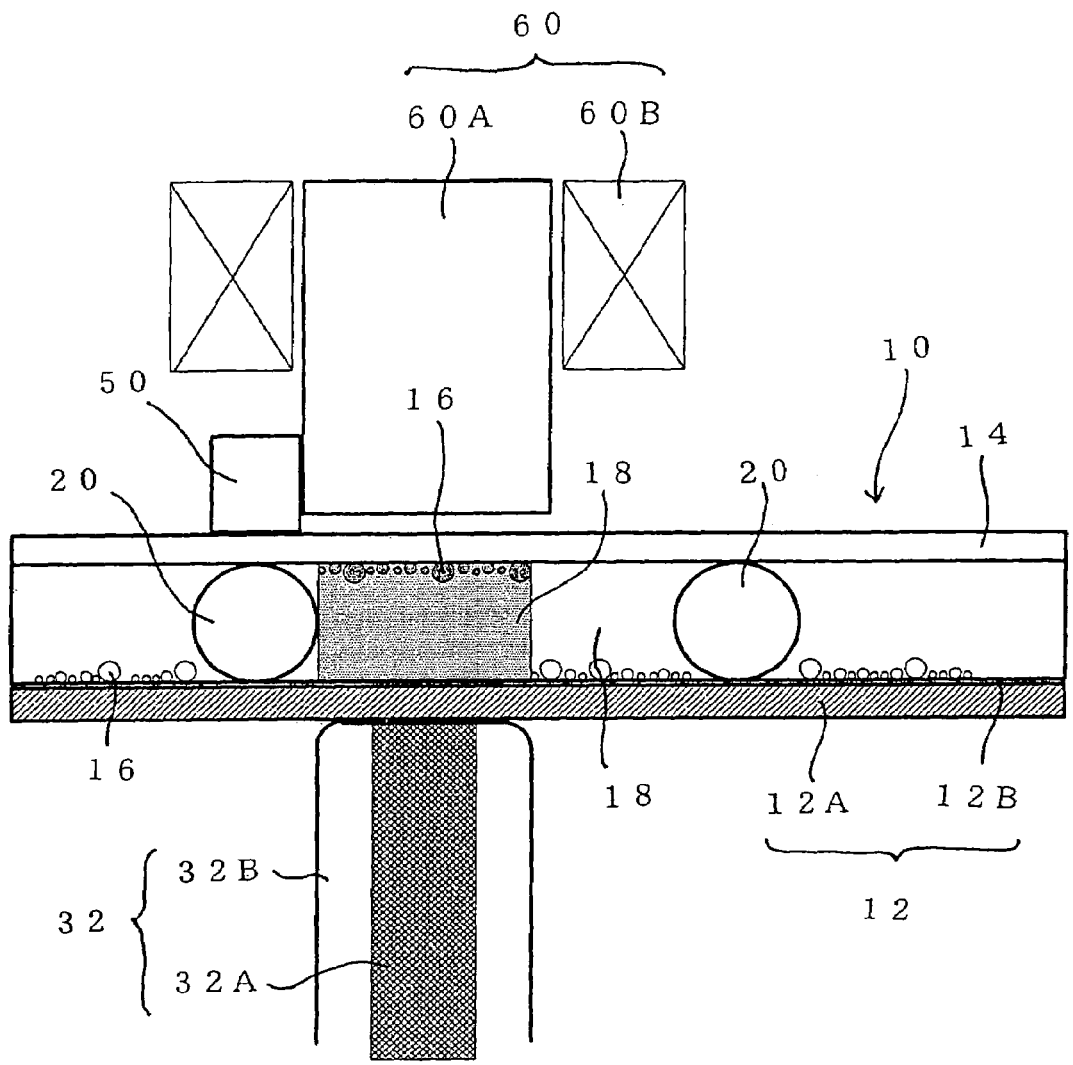
FIG. 7 is a sectional view showing a fourth modification of the rewritable thin image display sheet and the image display apparatus of the present invention.

While the magnetic head 34 in the aforementioned embodiment is composed of a permanent magnet, the present invention is not limited to such a structure. For example, as shown in FIG. 7 as a fourth modification, a magnetic head 60 may comprise a core 60A made of a material having a high magnetic permeability and a coil 60B wound around the outer periphery of the core 60A.

Alternatively, the magnetic head 60 may comprise a core composed of a permanent magnet, and a coil wound around the outer periphery of the permanent magnet. In this case, a magnetic force of the permanent magnet can be varied by exciting the coil or supplying current to the coil.

According to the fourth modification constructed as above, a displacement force to a magnetic powder 16 can be varied by controlling the amount of current to be supplied to the coil 60B. For example, plural kinds of magnetic powders 16 different in particle size are used. In this case, a small amount of current is first supplied to displace the magnetic powder 16 with a large particle size toward a transparent layer 14, and then the amount of current is gradually increased to displace magnetic powder 16 with a smaller particle size sequentially toward the transparent layer 14. In this manner, the amount of current can be controlled to display an image with excellent gradation expressing.

In the fourth modification, if plural kinds of magnetic powder 16 deferent in color are prepared, the amount of current can be varied to display an image with different colors or with multicolor (colorization)

While the aforementioned embodiment is designed to display an image on only one of the opposite surfaces of the image display sheet 10, the present invention is not limited to such a structure. For example, as shown in FIG. 8 as a fifth modification, it may be designed to display an image on each of the surfaces.

Figure 8:
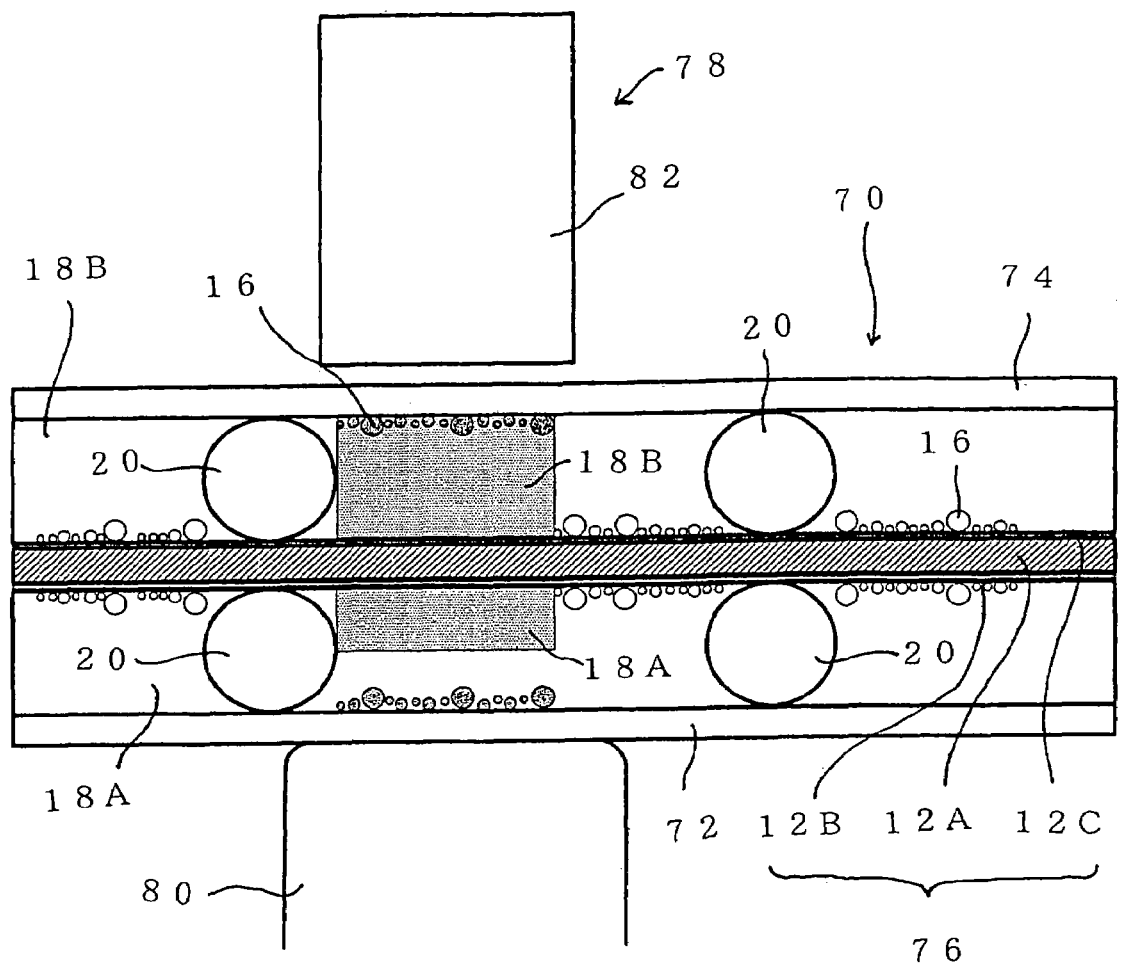
FIG. 8 is a sectional view showing a fifth modification of the rewritable thin image display sheet and the image display apparatus of the present invention.

Specifically, as shown in FIG. 8, a rewritable thin image display sheet 70 in the fifth modification comprises a lower transparent layer 72 disposed at a position corresponding to the base layer 12 in the aforementioned embodiment, an upper transparent layer disposed at a position corresponding to the transparent layer 74, and an intermediate heat-generation layer 76 disposed between the upper and lower transparent layers and formed to have the same structure as that of the base layer 12 in the first modification. The display sheet 70 further includes a low-melting-point wax 16A filled in the space between the intermediate heat-generation layer 76 and the lower transparent layer 72 while containing a magnetic powder 16A dispersed therein, and a low-melting-point wax 16B filled in the space between the intermediate heat-generation layer 76 and the upper transparent layer 74 while containing a magnetic powder 16B dispersed therein.

In the intermediate heat-generation layer 76 of the fifth modification, a positions of each of matrix-shaped electrode layers 12B, 12C corresponding to a pixel to be used for displaying an image is defined by a given intersection of orthogonally crossing electrode wirings, and a current is passed through a region of a resistive layer 12A located between the respective interconnections of the electrode layers 12B, 12C, so as to generate heat in the region of the resistive layer 12A corresponding to the intersections. Thus, the low-melting-point wax 18A, 18B located, respectively, on the lower and upper sides of the heat-generation region of the resistive layer 12A are molten.

An image display apparatus 78 for displaying an image on the above image display sheet comprises a control terminal (not shown) to be connected to the electrode layers 12B, 12C, a cooling head 80 disposed under the image display sheet 70, and a magnetic head 82 disposed above the image display sheet 70.

In the image display apparatus 78 constructed as above, when an image is displayed on the upper transparent layer 74 of the display sheet 70, a current is passed through a region of the intermediate heat-generation layer 76 corresponding to a given pixel, to generate heat in the region so as to melt the lower low-melting-point wax 18A together with the upper low-melting-point wax 18B. Thus, the magnetic powder 16B dispersed in a molten zone 18' of the upper low-melting-point wax 18B is displaced onto the upper transparent layer 74 by a magnetic head 82 to display an image on the upper transparent layer 74.

As mentioned above, the lower low-melting-point wax 18A is also molten in conjunction with the heat generation of the intermediate heat-generation layer 76. In this case, it can be assumed that the magnetic powder 16A dispersed in the lower low-melting-point wax 18A has already been displaced onto the lower transparent layer 72 to display an image. Even in such a case, a portion of the molten zone 18A' adjacent to the lower transparent layer 72 is cooled by the cooling head 80. Thus, the heat from the intermediate heat-generation layer 76 is not transferred to the low-melting-point wax 18A around the magnetic powder 16A displaced in the vicinity of the lower transparent layer 72.

Therefore, the magnetic powder 16A displaced in the vicinity of the lower transparent layer 72 to form the image on the lower transparent layer 72 is held in the vicinity of the lower transparent layer 72 without being displaced toward the intermediate heat-generation layer 76 by the magnetic head 82. That is, there is no risk of disarrangement in an image displayed on the lower transparent layer 72, due to the magnetic head 82.

According to the fifth modification constructed as above, an image can be displayed on either one of the front and back surfaces of the display sheet, or on both the front and back surfaces of the display sheet simultaneously, to provide usability closer to that of papers and enhanced effectiveness.

While the low-melting-point wax 18 in the aforementioned embodiment is made of petroleum-based paraffin, the present invention is not limited to such a material. For example, the low-melting-point wax 18 may be made of polyethylene terephthalate (PET) having a low melting point of 73° C. It is understood that a mixture of petroleum-based paraffin and PET may also be used.

While the aforementioned embodiment uses the technique of passing a current through the resistive layer to generate heat therein, as the heating means, the present invention is not limited to such a technique. It is understood that the heating means may be a technique using thermal head, or another technique of irradiating a sheet with a light absorption layer with laser light to generate heat precisely.

While the magnetic powder in the aforementioned embodiment is made of ferrite colored in black, the present invention is not limited to such a material. For example, the magnetic powder may be iron powder or ferrous oxide powder. In particular, ferrous oxide powder inherently exhibits block color. Thus, in case of using a black magnetic powder, it can be used directly without any coloring. Further, the magnetic powder may be composed of a magnetic fluid.

While the spacer 20 in the aforementioned embodiment is formed in a bead shape, the present invention is not limited to such a shape, but the spacer 20 may be formed in any other suitable shape, such as columnar or cylindrical shape.

As to the medium 18 in which the magnetic powder 16 is dispersed, as long as it is changeable between a first phase where the magnetic powder 16 is allowed to be displaced and a second phase where the magnetic powder 16 is prohibited from being displaced, the medium may be a low-temperature-melting material which exhibits the first phase at a high temperature and the second phase at a low temperature. In this case, the first phase and the second phase are a liquid phase and a solid phase, respectively. This type of medium includes low-temperature-melting material, such as low-melting-point wax; colloid, such as glycerin fatty acid ester; and unstable or quasi-stable gel, such as agar, gelatin, aluminum hydroxide, ferric hydroxide or bentonite, which utilizes sol-gel phase change (or fluidization based on light, ultrasound, magnetic oscillation, heating, magnetic field or electrolysis).

While the low-melting-point wax 18 used as a low-temperature-melting material in the aforementioned embodiment is made of petroleum-based paraffin, the present invention is not limited to such a material. For example, the low-melting-point wax 18 may be made of natural wax or carnauba wax.

While the water-cooled type of cooling head 50 is used in the aforementioned embodiment, the present invention is not limited to such a type. For example, the cooling head 50 may be any other suitable cooling type, such as a forced-air-cooling type using an electric fan, a naturally-air-cooling type using fins, or a heat-pipe-based cooling system.

While image erasing means has not been described in the above modifications 1 to 5 for simplifying the explanation, it is preferable to provide an image erasing mechanism in the image display apparatus 30 of the present invention. In conjunction with the following modifications, an image display apparatus incorporating an image erasing mechanism 84 will be described.

Figure 9:
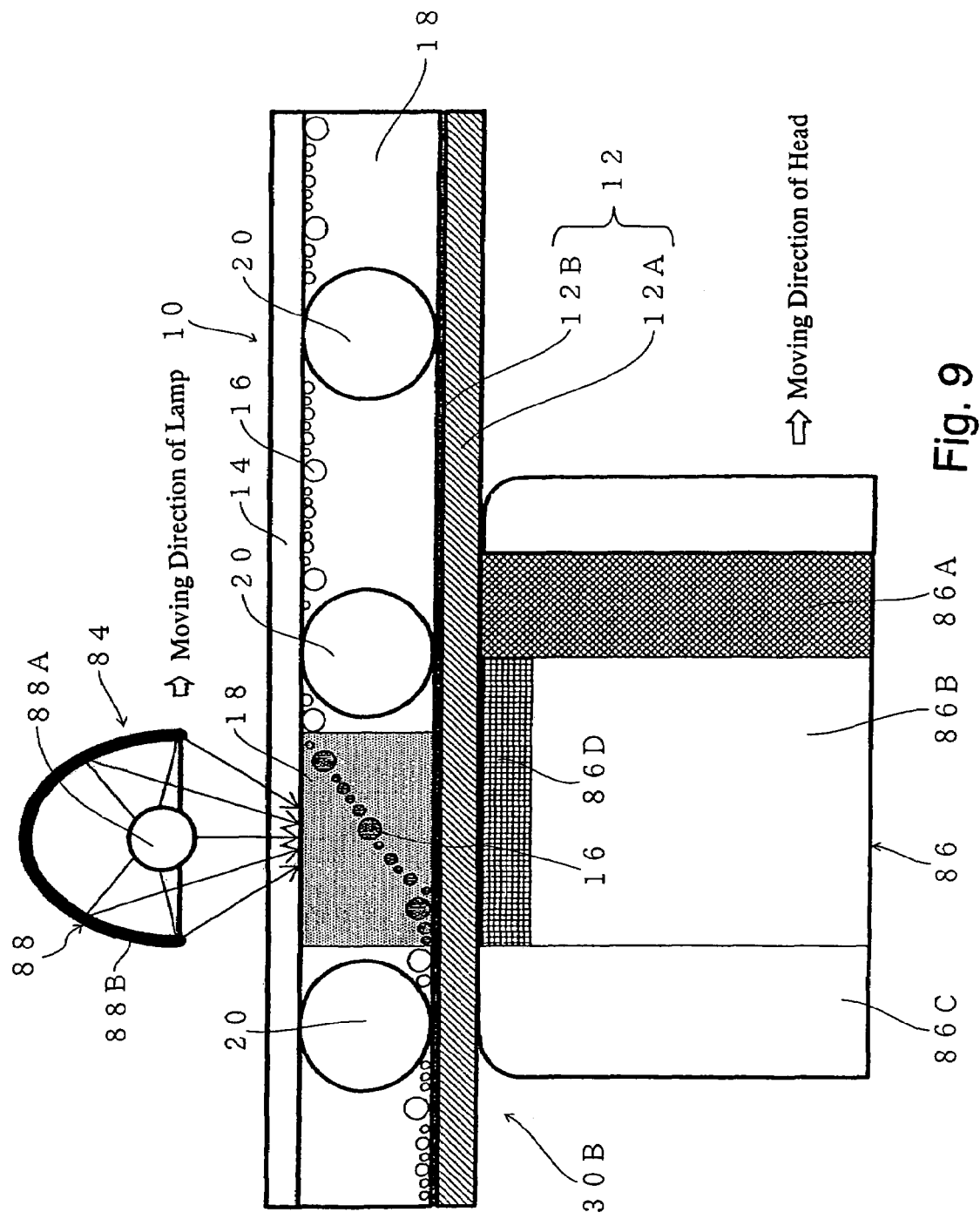
FIG. 9 is a sectional view showing a sixth modification of the rewritable thin image display sheet and the image display apparatus of the present invention.

FIG. 9 shows an image display apparatus 30B as a sixth modification. Except for the image erasing mechanism 84, and a writing/erasing head 86 as a substitute for the current supply head 32, the image display apparatus 30B has substantially the same structure as that of the aforementioned image display apparatus 30.

The writing/erasing head 86 is formed to have a width in a moving direction greater than that of the current supply head 32. More specifically, the width of the writing/erasing head 86 is set at a value greater than a distance between adjacent spaces 20. Thus, even if the writing/erasing head 86 is strongly pressed onto a resistive layer 12A of a base layer 12 during a writing or erasing operation, at least one spacer 20 can be unexceptionally located within the pressed region to reliable maintain the distance or space between the base layer 12 and a transparent layer 14.

In addition, such a strong pressing brings out so-called ironing effect in which even if the base layer 12 is deformed due to heat to be generated during the writing or erasing operation, the deformed region will be forcedly folded out by the writing/erasing head 86, and advantageously flattened.

The writing/erasing head 86 includes a line electrode serving as a writing head section 86A located on the downstream side relative to the moving direction thereof, which corresponds to the aforementioned current supply head 32, a line magnetic erasing head 86B located in the central portion thereof, and a cooling head 86C located on the upstream side, which has the same structure as that of the cooling head 80 in the aforementioned embodiment. A surface of the line magnetic erasing head 86B on the side of the display sheet 10 is covered with a low-friction heat-insulation member 86D. As seen in the above structure, the line magnetic erasing head 86B provided in the writing/erasing head 86 serves as a part of the image erasing mechanism 84.

A selective erasing head 88 serving as the remaining part of the image erasing mechanism 84 is disposed on the opposite site of the writing/erasing head 86 relative to the display sheet 10.

The selective erasing head 88 includes an infrared lamp 88A, and an elliptic mirror 88B covering the infrared lamp 88A to concentrate infrared heat generated from the infrared lamp 88A in a region of the display sheet 10 to be subjected to an image erasing operation.

This selective erasing head 88 is associated with a transfer mechanism (not shown) to be moved in synchronous with the writing/erasing head 86.

The selective erasing head 88 is designed, not shown in detail, such that it can be moved along a direction orthogonal to the display sheet 10 (or a direction getting close to/away from the display sheet 10), and the focal position of the elliptic mirror 88B can be adjusted to reliably heat a low-melting-point wax 18 depending on the thickness of the transparent layer 14 of the display sheet 10. The selective erasing head 88 movable along a direction orthogonal to the display sheet 10 allows energy/unit area given to the display sheet to be adjusted so as to set the correlation between the energy and a speed of the writing/erasing head 86 in the moving direction (or erasing speed) to assure the reliability of the erasing operation.

A detector (not shown) for detecting an image unformed region (or white region) of the display sheet 10 during the image erasing operation of the image erasing mechanism 84 may be provided. In this case, when a white region in the display sheet is detected according to the detector, the erasing speed in a moving region corresponding to the detected white region can be increased to reduce the time required for the erasing operation.

Figure 10:
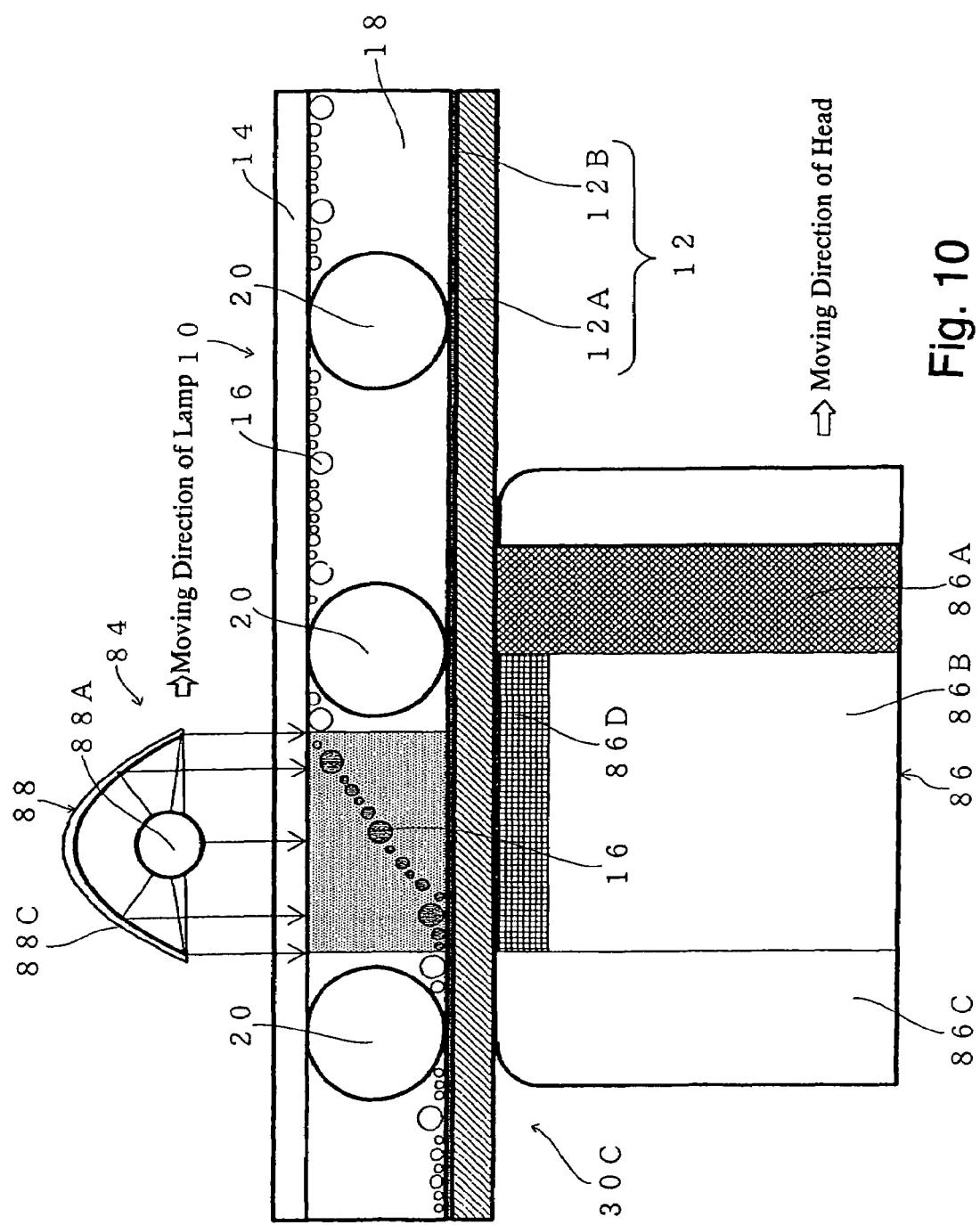
FIG. 10 is a sectional view showing a seventh modification of the rewritable thin image display sheet and the image display apparatus of the present invention.

With reference to FIG. 10, an image display apparatus 30C in a seventh modification will be described.

Except for the structure of a selective erasing head 88, the mage display apparatus 30C has substantially the same structure as that of the image display apparatus 30B in the sixth modification. Instead of the elliptic mirror 88B, the selective erasing head 88 of the image display apparatus 30C has a parabolic mirror 88C. The parabolic mirror 88C in the selective erasing head 88 changes the light emitted from an infrared lamp 88A into parallel light, and allows a display sheet 10 to be irradiated with the parallel light. Thus, as compared to the sixth modification, the mage display apparatus 30C in the seventh modification can heat the display sheet in a wider range.

Figure 11:
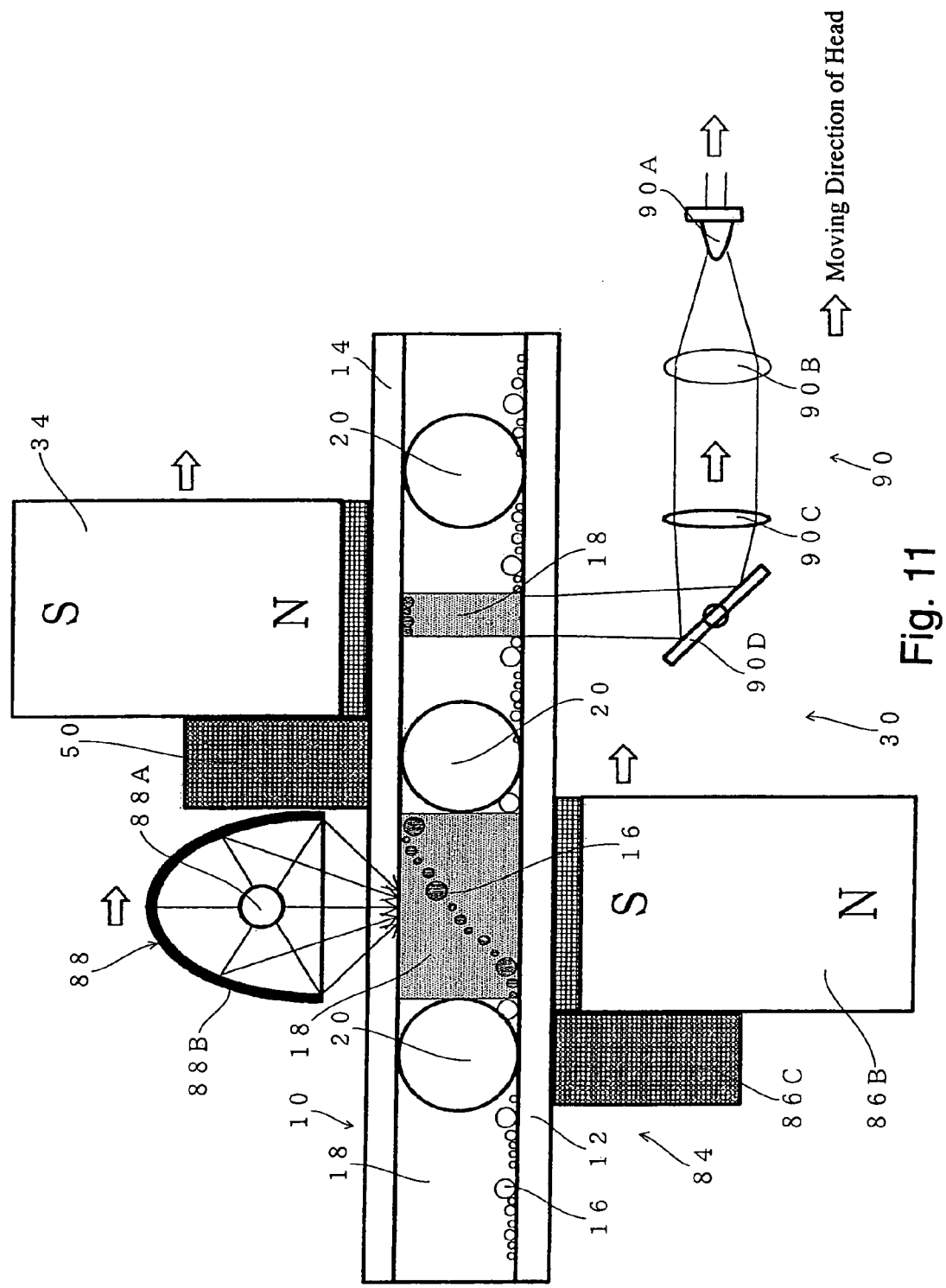
FIG. 11 is a sectional view showing an eighth modification of the rewritable thin image display sheet and the image display apparatus of the present invention.

While the above modifications use the current supply head 32, the matrix electrode 12B, 12C, the heat-generation plate 40 and/or the thermal head (not shown) as the means for displaying an image on the display sheet 10 (10'), the present invention is not limited to such a structure, but a laser system may be used as shown in FIG. 11 as an eighth modification.

The laser system 90 serving as image writing means in the eighth modification comprises a high-power semiconductor laser 90A serving as a power source, a collimator lens 90B for changing laser light from the semiconductor laser 90A into parallel light, a focusing lens 90C for focusing the laser light from the collimator lens 90B to a given spot diameter, and a polygon mirror 90D for performing a scanning operation with the laser light from the focusing lens 90. An arbitrary image can be written on the display sheet using the laser system 90.

In case of the display sheet 10' having the upper and lower transparent layers 12, 14, the laser light can be emitted from any directions. As might be expected, in case of the display sheet 10, the laser light can be emitted only from the side of the transparent layer 14.

As to the remaining structure, the same components as those in the aforementioned embodiment and the above modifications are defined by the same reference numeral and their description will be omitted.

Figure 12:
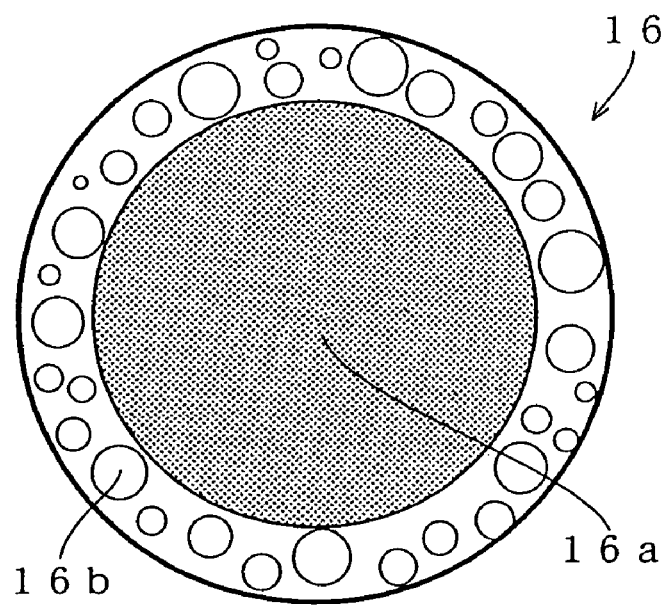
FIG. 12 is an enlarged sectional view showing a magnetic particle.

With reference to FIG. 12, the structure of the aforementioned magnetic powder will be described in detail below. As shown in an enlarged view of FIG. 12, the magnetic powder particle 16 includes a magnetic core 16a and a color coating layer 16b covering over the outer periphery of the magnetic core 16a. In this example, the magnetic core 16a is formed of a spherical sintered ferrite particle, and the color coating layer 16b is made of silicone resin having a thickness of about 1 to 3 μm. This silicone resin may be solid. If there is the need for the adjustment of specific gravity, the silicone resin may be prepared in the form of sponge through a forming process using a foaming agent.

Instead of spherical sintered ferrite particle, the magnetic core 16a may be formed of a fine ferrite powder solidified with a binder. Further, instead of silicone resin, the color coating layer 16*b* may be made of TFE (tetrafluoroethyleneor) or PTFE (polytetrafluoroethylene).

Figure 13:
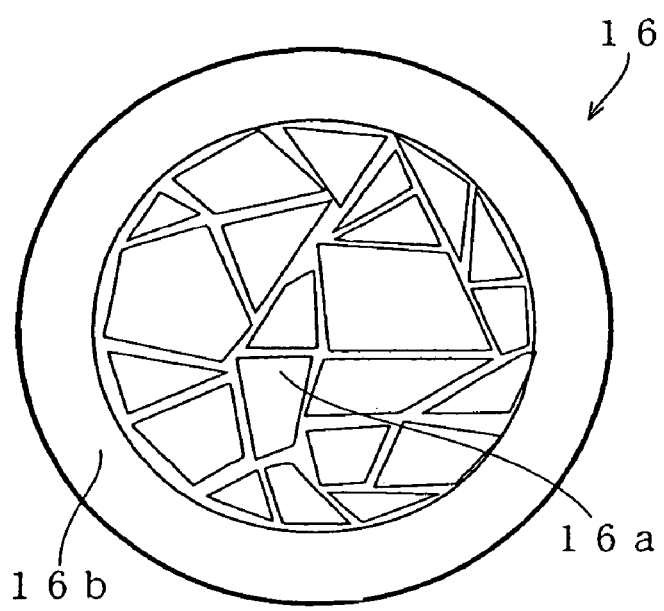
FIG. 13 is an enlarged sectional view showing a different magnetic particle from that in FIG. 12.

FIG. 13 shows another example of a magnetic powder different from the magnetic powder 16 in FIG. 12. As shown in an enlarged view of FIG. 13, a magnetic core 16*a* of the magnetic powder particle 16 is formed of a spherical agglomerate of granular sintered ferrite, or a spherical agglomerate of crystalline ferrite.

INDUSTRIAL APPLICABILITY

As mentioned above in detail, the present invention provides a rewritable thin image display sheet, an image display apparatus and an image display system, capable of reliably displaying an image in a rewritable state while achieving a significantly simplified structure.

The present invention also provides a rewritable thin image display sheet, an image display apparatus and an image display system, capable of reliably displaying an image with an enhanced resolution while achieving a significantly simplified structure.

Further, the present invention provides a rewritable thin image display sheet, an image display apparatus and an image display system, capable of reliably displaying an image while achieving a significantly simplified structure having a significantly reduced thickness.

Furthermore, the present invention provides a rewritable thin image display sheet, an image display apparatus and an image display system, capable of reliably displaying an image with an excellent gradation expression while achieving a significantly simplified structure.

What is claimed is:

1. A rewritable thin image display sheet comprising:
    a base layer;
    a transparent layer disposed apart from said base layer by a given distance; and
    a medium filled in the space between said base layer and said transparent layer and containing a magnetic powder dispersed therein, said medium being adapted to be changeable between a first phase where said magnetic powder is allowed to be displaced and a second phase where said magnetic powder is prohibited from being displaced,
    wherein said base layer includes an electrode layer and a resistive layer,
    said electrode layer is an overall electrode covering over an inner surface of said resistive layer on the side of the said transparent layer,
    said resistive layer has an electrical resistivity in a range of 10-300 Ω·cm and has an outer surface which is entirely exposed,
    said medium is made of a wax which exhibits said first phase in a temperature range of 60 to 120° C. and said second phase at a lower temperature than the temperature at which said first phase is exhibited.

2. The rewritable thin image display sheet as defined in claim 1, wherein said electrode layer includes a metal electrode.

3. The rewritable thin image display sheet as defined in claim 2, wherein said metal electrode is made of nickel.

4. The rewritable thin image display sheet as defined in claim 1, which includes a spacer defining the distance between said base layer and said transparent layer.

5. The rewritable thin image display sheet as defined in claim 4, wherein said spacer is formed in a bead shape.

6. The rewritable thin image display sheet as defined in claim 5, wherein said spacer has a diameter at least 5 times greater than the particle size of said magnetic powder.

7. The rewritable thin image display sheet as defined in claim 1, wherein said base layer is composed of a transparent layer.

8. The rewritable thin image display sheet as defined in claim 7, wherein said transparent layer includes a film made of transparent resin.

9. The rewritable thin image display sheet as defined in claim 7, wherein said transparent layer is formed to have flexibility.

10. The rewritable thin image display sheet as defined in claim 1, wherein said magnetic powder is colored in an arbitrary color.

11. The rewritable thin image display sheet as defined in claim 1, wherein said melting material is colored in white, and said magnetic powder is colored in a color other than white.

12. The rewritable thin image display sheet as defined in claim 11, wherein said magnetic powder is colored in black.

13. The rewritable thin image display sheet as defined in claim 1, wherein said transparent layer includes a film made of transparent resin.

14. The rewritable thin image display sheet as defined in claim 1, wherein each of said base layer and said transparent layer is formed to have flexibility.

15. The rewritable thin image display sheet as defined in claim 1, wherein each of the particles of said magnetic powder includes a magnetic core and a resin coating layer covering over the outer periphery of said magnetic core.

16. The rewritable thin image display sheet as defined in claim 15, wherein said magnetic core is formed of a spherical sintered ferrite particle.

17. The rewritable thin image display sheet as defined in claim 15, wherein said magnetic core is formed of a ferrite powder solidified with a binder.

18. The rewritable thin image display sheet as defined in claim 15, wherein said magnetic core is formed of a spherical agglomerate of granular sintered ferrite.

19. The rewritable thin image display sheet as defined in claim 15, wherein said magnetic core is formed of a spherical agglomerate of crystalline ferrite.

20. The rewritable thin image display sheet as defined in claim 15, wherein said resin coating layer is colored in an arbitrary color.

21. The rewritable thin image display sheet as defined in claim 15, wherein said resin coating layer is formed as a solid.

22. The rewritable thin image display sheet as defined in claim 15, wherein said resin coating layer is formed through a foaming process.

23. The rewritable thin image display sheet as defined in claim 1, wherein said resistive layer comprises a resin sheet.

24. A rewritable thin image display sheet comprising:
    a base layer;
    a transparent layer disposed apart from said base layer by a given distance;
    a medium filled in the space between said base layer and said transplant layer and containing a magnetic powder dispersed therein, said medium being adapted to be changeable between a first phase where said magnetic powder is allowed to be displaced and a second phase where said magnetic powder is prohibited from being displaced,
    wherein said medium is made of a wax which exhibits said first phase in a temperature range of 60 to 120° C. and said second phase at a lower temperature than the temperature at which said first phase is exhibited, said base layer includes a resistive layer and a pair of electrode layers each disposed to cover a corresponding one of the opposite surfaces of said resistive layer and formed with a matrix-shaped conductive pattern, said respective conductive patterns of said electrode layers have plural pairs of opposed intersection points to be selectively supplied with a current therebetween, whereby a current is passed through a region of said resistive layer located between the selected intersection points of said respective conductive patterns to selectively generate heat in said current-passing region of said resistive layer.

25. The rewritable thin image display sheet as defined in claim 24, wherein said resistive layer includes a synthetic resin sheet containing carbon dispersed therein to have said given electrical resistance so as to generate heat in response to a current passed therethrough.

26. The rewritable thin image display sheet as defined in claim 25, wherein said carbon is in the form of carbon particles.

27. The rewritable thin image display sheet as defined in claim 26, wherein said carbon particles have a nano-particle size.

28. A rewritable thin image display sheet comprising:
a first transparent layer;
a second transparent layer disposed apart from said first transparent layer by a given distance;
an intermediate heat-generation layer disposed between said first and second transparent layers and adapted to generate heat at an arbitrary position thereof;
a first melting material filled in the space between said intermediate heat-generation layer and said first transparent layer; and
a second melting material filled in the space between said intermediate heat-generation layer and said second transparent layer; and said first melting material and said second melting material containing a magnetic powder dispersed therein,
said first melting material and said second melting material being adapted to be changeable between a first phase where said magnetic powder is allowed to be displaced and a second phase where said magnetic powder is prohibited from being displaced,
said first melting material and said second melting material being made of a wax which exhibits said first phase in a temperature range of 60 to 120° C. and said second phase at a lower temperature than the temperature at which said first phase is exhibited,
wherein said intermediate heat-generation layer includes a resistive layer and a pair of electrode layers each disposed to cover a corresponding one of the opposite surfaces of said resistive layer and formed with a matrix-shaped conductive pattern,
said respective conductive patters of said electrode layers have plural pairs of opposed intersection points to be selectively supplied with a current therebetween,
whereby a current is passed through a region of said resistive layer located between the selected intersection points of said respective conductive patterns to selectively generate heat in said current-passing region of said resistive layer.

29. The rewritable thin image display sheet as defined in claim 28, which includes a spacer defining the respective distances between said first transparent layer and said intermediate heat-generation layer and between said second transparent layer and said intermediate heat-generation layer.

30. The rewritable thin image display sheet as defined in claim 29, wherein said spacer is formed in a bead shape.

31. The rewritable thin image display sheet as defined in claim 30, wherein said spacer has a diameter at least 5 times greater than the particle size of said magnetic powder.

32. The rewritable thin image display sheet as defined in claim 28, wherein said magnetic powder is colored in an arbitrary color.

33. The rewritable thin image display sheet as defined in claim 28, wherein said melting material is colored in white, and said magnetic powder is colored in a color other than white.

34. The rewritable thin image display sheet as defined in claim 33, wherein said magnetic powder is colored in black.

35. The rewritable thin image display sheet as defined in claim 28, wherein each of said first and second transparent layers includes a film made of transparent resin.

36. The rewritable thin image display sheet as defined in claim 28, wherein each of said first and second transparent layers is formed to have flexibility.

37. The rewritable thin image display sheet as defined in claim 28, wherein each of the particles of said magnetic powder includes a magnetic core and a resin coating layer covering over the outer periphery of said magnetic core.

38. The rewritable thin image display sheet as defined in claim 37, wherein said magnetic core is formed of a spherical sintered ferrite particle.

39. The rewritable thin image display sheet as defined in claim 37, wherein said magnetic core is formed of a ferrite powder solidified with a binder.

40. A rewritable thin image display sheet comprising:
a base layer;
a transparent layer disposed apart from said base layer by a given distance; and
a medium filled in the space between said base layer and said transparent layer and containing- a magnetic powder dispersed therein, said medium being adapted to be changeable between a first phase where said magnetic powder is allowed to be displaced and a second phase where said magnetic powder is prohibited from being displaced,
wherein said base layer includes an electrode layer and a resistive layer,
said electrode layer is an overall electrode covering over an inner surface of said resistive layer on the side of the said transparent layer,
said resistive layer is a resin sheet having carbon loaded therein and has an outer surface which is entirely exposed,
said medium is made of a wax which exhibits said first phase in a temperature range of 60 to 120° C. and said second phase at a lower temperature than the temperature at which said first phase is exhibited.

* * * * *